United States Patent
Chidlovskii et al.

(10) Patent No.: US 9,710,729 B2
(45) Date of Patent: Jul. 18, 2017

(54) DOMAIN ADAPTATION FOR IMAGE CLASSIFICATION WITH CLASS PRIORS

(71) Applicant: Xerox Corporation, Norwalk, CT (US)

(72) Inventors: Boris Chidlovskii, Meylan (FR); Gabriela Csurka, Crolles (FR)

(73) Assignee: XEROX CORPORATION, Norwalk, CT (US)

( * ) Notice: Subject to any disclaimer, the term of this patent is extended or adjusted under 35 U.S.C. 154(b) by 174 days.

(21) Appl. No.: 14/477,215

(22) Filed: Sep. 4, 2014

(65) Prior Publication Data

US 2016/0070986 A1  Mar. 10, 2016

(51) Int. Cl.
  G06K 9/62  (2006.01)
  G06K 9/00  (2006.01)
  (Continued)

(52) U.S. Cl.
  CPC ....... G06K 9/6259 (2013.01); G06K 9/00624 (2013.01); G06K 9/00771 (2013.01);
  (Continued)

(58) Field of Classification Search
  None
  See application file for complete search history.

(56) References Cited

U.S. PATENT DOCUMENTS

| | | | |
|---|---|---|---|
| 7,136,828 B1 * | 11/2006 | Allen | G08G 1/017 235/384 |
| 9,087,297 B1 * | 7/2015 | Filippova | G06F 17/30781 |

(Continued)

OTHER PUBLICATIONS

Fernando et al., "Unsupervised Visual Domain Adaptation Using Subspace Alignment", IEEE International Conference on Computer Vision, 2013, pp. 2960-2967.*

(Continued)

*Primary Examiner* — Matthew Bella
*Assistant Examiner* — Jose M Torres
(74) *Attorney, Agent, or Firm* — Fay Sharpe LLP

(57) ABSTRACT

In camera-based object labeling, boost classifier $f^T(x)=\Sigma_{r=1}^M \beta_r h_r(x)$ is trained to classify an image represented by feature vector x using a target domain training set $D_T$ of labeled feature vectors representing images acquired by the same camera and a plurality of source domain training sets $D_{S_1}, \ldots, D_{S_N}$ acquired by other cameras. The training applies an adaptive boosting (AdaBoost) algorithm to generate base classifiers $h_r(x)$ and weights $\beta_r$. The $r^{th}$ iteration of the AdaBoost algorithm trains candidate base classifiers $h_r^k(x)$ each trained on a training set $D_T \cup D_{S_k}$, and selects $h_r(x)$ from previously trained candidate base classifiers. The target domain training set $D_T$ may be expanded based on a prior estimate of the labels distribution for the target domain. The object labeling system may be a vehicle identification system, a machine vision article inspection system, or so forth.

21 Claims, 3 Drawing Sheets

(51) Int. Cl.
*G06K 9/66* (2006.01)
*G06K 9/46* (2006.01)

(52) U.S. Cl.
CPC .......... *G06K 9/00785* (2013.01); *G06K 9/46* (2013.01); *G06K 9/62* (2013.01); *G06K 9/627* (2013.01); *G06K 9/6217* (2013.01); *G06K 9/6256* (2013.01); *G06K 9/6257* (2013.01); *G06K 9/6267* (2013.01); *G06K 9/6288* (2013.01)

(56) References Cited

U.S. PATENT DOCUMENTS

| | | | | |
|---|---|---|---|---|
| 2005/0249401 | A1* | 11/2005 | Bahlmann | G06K 9/6256 382/159 |
| 2005/0289089 | A1* | 12/2005 | Abe | G06N 99/005 706/12 |
| 2006/0062451 | A1* | 3/2006 | Li | G06K 9/00228 382/159 |
| 2008/0027887 | A1* | 1/2008 | Barbu | G06K 9/6256 706/25 |
| 2008/0175438 | A1* | 7/2008 | Alves | G08G 1/0175 382/105 |
| 2016/0078359 | A1* | 3/2016 | Csurka | G06N 7/005 706/12 |
| 2016/0253597 | A1* | 9/2016 | Bhatt | G06N 99/005 |

OTHER PUBLICATIONS

Yao et al., "Boosting for transfer learning with multiple sources", 2010 IEEE Conference on Computer Vision and Pattern Recognition (CVPR), 2010, pp. 1855-1862.*

Al-Stouhi, et al., "Adaptive Boosting for Transfer Learning using Dynamic Updates," Machine Learning and Knowledge Discovery in Databases, vol. 6911 of Lecture Notes in Computer Science, pp. 60-75 (2011).

Beijbom, "Domain Adaptations for Computer Vision Applications," Technical Report, pp. 1-9 (2012).

Dai, et al., "Boosting for Transfer Learning," Proceeding of 24th International conference on Machine learning, pp. 193-200 (2007).

Schapire, et al., "A Brief Introduction to Boosting," Journal-Japanese Society for Artificial Intelligence, vol. 14 pp. 771-780 (1999).

Gong, et al., "Reshaping Visual Datasets for Domain Adaptation," Advances in Neural Information Processing Systems, pp. 1286-1294 (2013).

Raghuraman, et al., "Domain Adaptation for Object Recognition: An Unsupervised Approach," Computer Vision (ICCV), pp. 999-1006 (2011).

Hoffman, et al., "Discovering Latent Domains for Multisource Domain Adaptation," Computer Vision-ECCV, pp. 702-715 (2012).

Daume III, "Frustratingly easy domain adaptation," CoRR, abs/0907.1815, pp. 1-8 (2009).

Daume III, et al., "Domain Adaptation for Statistical Classifiers," Journal of Artificial Intelligence Research vol. 26, pp. 101-126 (2006).

Jhuo, et al., "Robust Visual Domain Adaptation with Low-Rank Reconstruction," CVPR, pp. 2168-2175 (2012).

Jiang, "A Literature Survey on Domain Adaptation of Statistical Classifiers," Technical Report, pp. 1-12 (2008).

Saenko, et al., "Adapting Visual Category Models to New Domains," Computer Vision Conference, vol. 6314 of Lecture Notes in Computer Science pp. 213-226 (2010).

Pan, et al., "A Survey on Transfer Learning," IEEE Transactions on Knowledge and Data Engineering, vol. 22, No. 10, pp. 1345-1359 (Oct. 2010).

Patel, et al., "Visual Domain Adaptation: An Overview of Recent Advances," pp. 1-34 (Feb. 19, 2014).

Rusinkiewicz, et al., "Efficient Variants of the ICP Algorithm," 3-D Digital Imaging and Modeling, pp. 145-152 (2001).

Saenko, et al., "What You Saw is Not What You Get: Domain Adaptation Using Asymmetric Kernel Transforms," In Computer Vision and Pattern Recognition (CVPR) pp. 1785-1792 (Jun. 2011).

Tommasi, et al., "Frustratingly Easy NBNN Domain Adaptation," ICCV, pp. 1-8 (2013).

Xu, et al., "Multi-view Transfer Learning with Adaboost," Neural Information Processing, vol. 7665 of Lecture Notes in Computer Science, pp. 332-339 (2012).

* cited by examiner

DOMAIN ADAPTATION FOR IMAGE CLASSIFICATION WITH CLASS PRIORS

BACKGROUND

The following relates to the image labeling arts, camera-based object labeling arts, and to applications of same such as vehicle labeling and so forth.

Camera-based vehicle labeling (or classification) using a still camera or video camera has diverse applications, such as in: automated or semi-automated toll assessment for toll roads, bridges, parking, or so forth (where, for example, the toll may depend on the number of wheel axles, or the vehicle type, e.g. trucks may pay a higher toll than cars); automated monitoring of a parking facility (e.g., detecting whether or not a vehicle is in a parking spot—this actually labels the parking spot, rather than the vehicle); camera based enforcement of speed limits or other traffic regulations (where the vehicle is labeled as to its speed, or as to whether it has run a red light); monitoring of carpool lanes (where the vehicle is labeled by number of occupants); roadway usage studies (where vehicles may be classified as to their state or country of registration based on their license plates); and so forth. Depending upon the type of vehicle labeling to be performed, the vehicle image that is used for the automated vehicle labeling may be an image of the entire vehicle, or an image of a portion of the vehicle, such as the rear license plate.

In a common installation approach, the camera is mounted so as to have a suitable view of the toll booth entrance, roadway, parking lot entrance, or other location to be monitored, and a set of training vehicle images are acquired. A human installer manually labels each training image as to the vehicle type. These labeled vehicle images form a labeled training set for the camera installation, which are then used to train a vehicle classifier. The training process typically entails optional pre-processing of the image (for example, in the case of license plate labeling, the pre-processing may include identifying the video frame that optimally shows the rear license plate and then segmenting the frame image to isolate the license plate), generating a quantitative representation, e.g. feature vector, representing (optionally pre-processed) image, and training the classifier to assign labels to the feature vector representations that optimally match the manually assigned labels. Thereafter, during the labeling phase, when the camera acquires an image of a vehicle it is analogously pre-processed and converted to a feature vector which is then run through the trained classifier to label the vehicle.

In a typical application, cameras are placed at various strategic locations: for example, at various toll booths, and each camera is independently trained and thereafter used to label vehicles at (or passing through) the location.

However, independently training each camera fails to leverage information that may have been collected from earlier-installed cameras. Independently training each camera can also lead to significant camera-to-camera variations in vehicle labeling performance. Still further, training each camera independently may fail to leverage prior information that may be available on the label distribution, for example from statistics generated by other similar camera installations, prior roadway studies, or from other sources.

While some sort of combined training of multiple camera installations thus appears to be of value, there are impediments to this approach. Vehicle images acquired by different cameras may differ significantly from one another due to differences in the pose, camera angle, camera resolution or other camera characteristics, amount of motion blur, scene illumination, background clutter, or so forth. Vehicle statistics may also differ from one location to another—for example, a toll booth close to a residential area may observe mostly passenger cars, whereas a rural toll booth near a freeway interchange may observe a higher fraction of commercial trucks.

While the illustrative embodiments disclosed herein are directed to camera-based vehicle labeling tasks, it will be appreciated that similar difficulties arise in other camera-based object labeling tasks in which multiple still or video cameras are used to acquire images of objects to be labeled (or in which the same camera is used to acquire the images over different time intervals and/or at different locations). For example, in a retail or advertising setting it may be useful to employ camera-based customer labeling as to gender, age, or so forth in order to provide targeted advertising. In this case the objects to be labeled are human beings. In an event attendance monitoring system images may be labeled as to the number of people shown in the image. Objects may also be animals, or inanimate objects such as the illustrative vehicles. As further examples of camera-based labeling of inanimate objects of interest, in a retail assembly line articles of manufacture may be labeled as to the presence or absence of a certain defect based on an imaging technology that is capable of observing the defect. In the case of a security scanner, the camera may be an x-ray imager or other specialized imaging device, and the object labeling seeks to identify inanimate objects of concern such as firearms, knives, fluids, or so forth. These are again merely illustrative examples.

Furthermore, the classifier training systems disclosed herein may be employed in classifying images for purposes other than labeling of the object shown in the image.

Disclosed in the following are improved image and object labeling techniques, with illustrative description of vehicle labeling tasks.

BRIEF DESCRIPTION

In some embodiments disclosed herein, a labeling system comprises an electronic data processing device configured to label an image to be labeled belonging to a target domain by operations including training a boost classifier $f^T(x)=\Sigma_{r=1}^M \beta_r h_r(x)$ to classify an image belonging to the target domain and represented by a feature vector x, computing a feature vector $x_{in}$ representing the image to be labeled, and generating a label for the image to be labeled by operations including evaluating $f^T(x_{in})=\Sigma_{r=1}^M \beta_r h_r(x_{in})$. The training uses a target domain training set $D_T$ comprising labeled feature vectors representing images belonging to the target domain, and a plurality of source domain training sets $D_{S_1}, \ldots, D_{S_N}$ where $N \geq 2$ comprising labeled feature vectors representing images belonging to source domains $S_1, \ldots, S_N$ respectively. The training suitably comprises applying an adaptive boosting (AdaBoost) algorithm to generate the base classifiers $h_r(x)$ and the base classifier weights $\beta_r$ of the boost classifier $f^T(x)$. The $r^{th}$ iteration of the AdaBoost algorithm includes (i) performing N sub-iterations in which the $k^{th}$ sub-iteration trains a candidate base classifier $h_r^k(x)$ on a training set combining the target domain training set $D_T$ and the source domain training set $D_{S_k}$, and (ii) selecting $h_r(x)$ as the candidate base classifier with lowest error for the target domain training set $D_T$. The $r^{th}$ iteration may further include (iii) updating weight vectors $w_i^{S_k}$ for the training instances i of the source training sets $D_{S_k}$, k=1, ..., N based on the error for the target domain training set $D_T$ of the candidate base classifier selected as the base classifier $h_r(x)$. In some embodiments the labeling system is a camera-based object labeling system further comprising a system camera arranged to acquire images of objects, the target domain is defined as the domain of images of objects acquired by the system camera and the image to be labeled is an image of an object to be labeled acquired by the system camera, each source domain $S_1, \ldots, S_N$ is defined as the domain of images of objects acquired by a camera other than the system camera, and the electronic data processing device is further configured to generate a label for the object to be labeled based on the label generated for the image to be labeled. In some embodiments the camera-based labeling system further includes a display device operatively connected with the electronic data processing device to display the image of the object to be labeled together with the label generated for the object. The training of the boost classifier $f^T(x)=\Sigma_{r=1}^M \beta_r h_r(x)$ may further include, before applying the Adaboost algorithm, performing unsupervised source-target domain alignment to align the target domain training set $D_T$ and the source training sets $D_{S_k}$, $k=1, \ldots, N$, and/or expanding the target domain training set $D_T$ based on a prior estimate of the labels distribution for the target domain. Such expansion may be done by adding to the target domain training set $D_T$ additional synthesized instances with different labels wherein the synthesized instances have initialized weight vectors for the Adaboost algorithm computed based on label probabilities generated using the prior estimate of the labels distribution.

In some embodiments disclosed herein, a labeling method for labeling an image to be labeled belonging to a target domain comprises: computing feature vectors representing target domain training images belonging to the target domain; labeling the target domain training images using labels selected from a set of labels to generate a target domain training set $D_T$ comprising labeled feature vectors representing the target domain training images; receiving a plurality of source domain training sets $D_{S_1}, \ldots, D_{S_N}$ where $N \geq 1$ comprising feature vectors representing images belonging to source domains different from the target domain that are labeled using labels selected from the set of labels; performing unsupervised source-target domain alignment to align the target domain training set $D_T$ and the source training sets $D_{S_k}$, $k=1, \ldots, N$; training a boost classifier $f^T(x)=\Sigma_{r=1}^M \beta_r h_r(x)$ to classify an image belonging to the target domain and represented by a feature vector x using the aligned target domain training set $D_T$ and plurality of source domain training sets $D_{S_1}, \ldots, D_{S_N}$; computing a feature vector $x_{in}$ representing the image to be labeled; and generating a label for the image to be labeled by operations including evaluating $f^T(x_{in})=\Sigma_{r=1}^M \beta_r h_r(x_{in})$. The feature vector computing operations, the training operation, and the generating operation are suitably performed by an electronic data processing device. The training applies an adaptive boosting (AdaBoost) algorithm to generate the base classifiers $h_r(x)$ and the base classifier weights $\beta_r$, of the boost classifier $f^T(x)$, where $r=1, \ldots, M$. In some embodiments the set of labels is a set of object labels, the images are images of objects, and the labeling method further comprises generating and displaying, on a display device, an object inspection result based on the generated label. For example, the objects may be vehicles and the vehicle inspection result a number of occupants of the vehicle; or, in other embodiments, the objects may be articles of manufacture being processed by an assembly line and the article inspection result may be a pass or fail result.

In some embodiments disclosed herein, a non-transitory storage medium stores instructions executable by an electronic data processing device to perform a camera-based object labeling method to label an object based on an image of the object acquired using a target camera. The labeling method includes the operations of: training a boost classifier $f^T(x)=\Sigma_{r=1}^M \beta_r h_r(x)$ to classify an image acquired by the target camera and represented by a feature vector x using a target domain training set $D_T$ comprising labeled feature vectors representing images acquired by the target camera and a plurality of source domain training sets $D_{S_1}, \ldots, D_{S_N}$ where $N \geq 2$ comprising labeled feature vectors representing images of objects acquired by cameras other than the target camera; computing a feature vector $x_{in}$ representing the image of the object; and generating a label for the object by evaluating $f^T(x_{in})=\Sigma_{r=1}^M \beta_r h_r(x_{in})$. The training applies an adaptive boosting (AdaBoost) algorithm to generate the base classifiers $h_r(x)$ and the base classifier weights $\beta_r$ of the boost classifier $f^T(x)$. The AdaBoost algorithm includes $r=1, \ldots, M$ iterations, and the $r^{th}$ iteration includes training a plurality of candidate base classifiers $h_r^k(x)$ wherein each candidate base classifier $h_r^k(x)$ is trained on a training set $D_T \cup D_{S_k}$, and selecting $h_r(x)$ from a set of previously trained candidate base classifiers. Before applying the Adaboost algorithm, the target domain training set $D_T$ may be expanded based on a prior estimate of the labels distribution for the target domain, for example by adding to the target domain training set $D_T$ additional synthesized instances with different labels, in which the synthesized instances have initialized weight vectors for the Adaboost algorithm computed based on label probabilities generated using the prior estimate of the labels distribution.

DETAILED DESCRIPTION

The following relates to image labeling systems and to camera-based object labeling systems. As used herein, the term "object" refers to an inanimate object (or group of inanimate objects) or an animate object (such as a person or group of people, or an animal or group of animals). As used herein, the term "object" refers to a physical object that can be imaged by the camera used in the labeling system. By way of some non-limiting examples, an inanimate object of interest may be a vehicle (which is the illustrative application herein), an article of manufacture, contents of a piece of luggage or transport bin being scanned by an airport security system, or so forth. The set of labels applied by the labeling system can be set of labels for the image generally (in the case of an image labeling system) or a set of labels for the object. By way of illustrative example, the set of labels a vehicle may be a set of vehicle types (passenger car, small truck, large truck, bus, et cetera), or the set of number of vehicle occupants (one, two, three, . . . ), or so forth. As another illustrative example, in the context of a machine vision inspection apparatus, the objects may be articles of manufacture being processed by an assembly line and the set of labels may be a binary set (1,0) where "1" denotes the article having a defect that is identified by the inspection apparatus while "0" denotes the article being free of the defect.

As used herein, the term "camera" refers to an imaging device that is capable of acquiring an image of an object of interest. By way of some non-limiting examples, the camera may be: a conventional camera including photographic film or a digital imaging array (e.g. CCD array optionally with color filters) that is capable of acquiring color or monochrome images similar to those that would be observed by human vision; or an x-ray scanner including an x-ray sensitive imaging array operating in conjunction with an x-ray source to generate an x-ray projection image; or a computed tomography scanner; or an infrared camera of the type used to acquire night or low-light images; or a document scanner operating to generate document page images; or so forth. It is contemplated for the camera to be specialized for the specific object labeling task, for example including wavelength selective filters so as to be sensitive to wavelength(s) emitted by a fluorescent dye that is expected to be present on or in the object. In general the camera may be a still camera (that is, acquires a single static image) or a video camera (that is, acquires a time sequence of images commonly called "frames"—here the image pre-processing may entail selecting a frame of a video burst that optimally captures the object of interest). In some types of cameras, such as a computed tomography scanner, data acquired from the object by the camera may undergo image reconstruction processing in order to generate the image.

Figure 1:
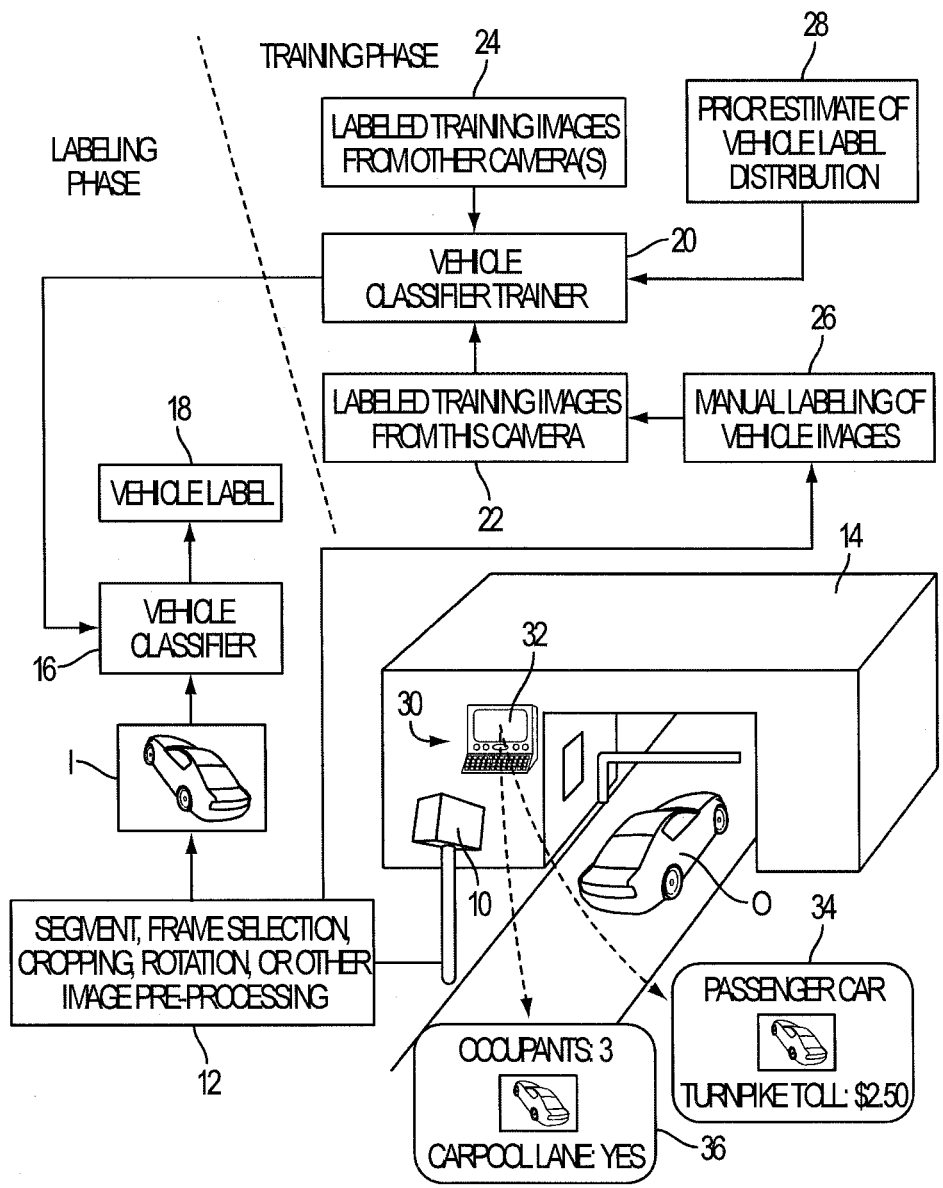
FIG. 1 diagrammatically shows a camera-based vehicle identification system.

With reference to FIG. 1, an illustrative camera-based object labeling task labels an object O, which in the illustrative vehicle labeling task is a vehicle O, based on an image I of the object O generated using a camera 10, optionally in combination with some post-data acquisition (pre-)processing 12 such as segmentation to isolate the object in the image, selection of a frame (in the case in which the camera 10 is a video camera acquiring a video burst comprising a time sequence of images, i.e. frames) that optimally shows the object O, image cropping (possibly performed in combination with segmentation of the image), image rotation, elastic or inelastic deformation, registration with a template shape, color filtering, edge detection, or so forth. The output of the camera 10, optionally after undergoing the pre-processing 12, is an image I of the object O that is to be labeled (that is, classified).

Illustrative FIG. 1 shows a typical vehicle labeling environment. The vehicle O is approaching a toll booth 14 at which the driver of the vehicle O will pay a toll for access to a toll road, toll bridge, or the like controlled by the toll booth 14. The camera 10 is strategically positioned to observe the vehicle O as it approaches the toll booth 14. Acquisition of an image (which may be a single still image or a video burst) is suitably triggered by a motion sensor (not shown) that detects the moving vehicle O as it approaches the toll both 14. For vehicle labeling, the camera 10 is suitably a conventional camera that includes a digital imaging array (e.g., charge-coupled device, CCD, array, optionally with color filters to provide a color imaging array) and acquires an image of the vehicle O that is similar to what would be observed by human vision (although some differences are contemplated, for example the image I may be a monochrome image). Accordingly, the optional image pre-processing 12 may include various image manipulations, but does not include an image reconstruction operation. By contrast, for some other types of object labeling tasks that employ tomographic imagers, the image pre-processing may include an image reconstruction process performed on the image data acquired by the camera to generate the image of the object. The image pre-processing 12 may include generic pre-processing that is not specific to the object labeling task, such as blur compensation, brightness and/or contrast adjustment, or so forth. The image pre-processing 12 may additionally or alternatively include labeling task-specific image pre-processing, such as identifying the optimal frame of a video burst, segmenting the image to isolate the object in the image, cropping the image to remove extraneous background (typically performed after segmenting the image to isolate the object), performing elastic or inelastic deformation, rotation, or other manipulation of the image to match it with a template, or so forth. The labeling task-specific image pre-processing 12 may also include a go/no go test that determines whether the image is sufficiently representative of the object to go forward with the labeling task. For example, in the illustrative vehicle labeling task the motion sensor of the camera 10 might be inadvertently triggered by blowing leaves or the like, in which case the go/no go test would detect that no vehicle is imaged and therefore discard the image.

With continuing reference to FIG. 1, the image I is input to a vehicle classifier 16 that generates a label 18 for the vehicle based on the image I. This is referred to as the "labeling phase" of the camera-based vehicle labeling process.

Prior to performing an instance of the labeling phase, the vehicle classifier 16 is optimized to perform the labeling operation. To this end, in a "training phase" a vehicle classifier trainer 20 processes labeled images 22, 24 to optimize the vehicle classifier 16 so that it generates labels for the images 22, 24 that closely match the labels that are pre-assigned to the labeled images 22, 24. In embodiments of the vehicle classifier trainer 20 disclosed herein, the training process uses both (i) labeled images 22 generated for the camera 10 of the camera-based object labeling system for which the classifier 16 is being trained to operate (also called "this camera" herein), and also (ii) labeled images 24 generated by one or more other sources, such as by similar camera-based vehicle labeling systems that have been in operation at other toll booths (also called "other cameras" herein). To generate the labeled images 22 acquired by this camera, a human toll booth operator, or a human vehicle labeling system installer, or other person performs manual labeling 26 of images acquired by the camera 10, typically by observing each vehicle that comes through the toll booth 14 and then labeling the image of that vehicle acquired by the camera 10 based on that observation.

The labeled images 24 from other cameras may be generated in the same way (except using the other camera). More typically, however, the labels of the labeled images 24 from other cameras are generated by automatic image labeling performed by a trained classifier (corresponding to, but a different instance of, the classifier 16) operating at the other camera-based vehicle labeling installation(s). It will be appreciated that because the labeled images 22 for this camera are generated by the manual labeling 26; whereas, the labeled images 24 for other cameras may be generated automatically and possibly during the normal vehicle labeling operations of those other installations, the quantity of labeled images 24 from other cameras can be much larger than the quantity of labeled images 22 manually labeled for this camera. In other words, in many practical training situations the data set 24 is many times larger than the data set 22.

In some embodiments of the vehicle classifier trainer 20 disclosed herein, the training process further leverages a prior estimate 28 of the vehicle label distribution that is expected to be observed at the toll booth 14 (that is, that is expected to be observed at this installation). This prior estimate 28 can come from various sources, such as from other toll booths that are expected to have similar usage by vehicles, or from a manual survey of traffic entering at the location of the toll booth 14, or so forth. Leveraging the prior estimate 28, if available, during training off the classifier 16 can improve the accuracy of the trained vehicle classifier 16 by biasing the training to provide results in accord with the expected distribution 28 of labels.

The illustrative vehicle labeling system includes the camera 10, the optional image pre-processing component 12, the vehicle classifier trainer 20, and the trained classifier 16 that is generated by the vehicle classifier trainer 20. The vehicle labeling system may further include other components not illustrated in FIG. 1. For example, if the vehicle labeling system is performing a toll calculation task, the system may further include a look-up table that assigns the toll based on the vehicle label (e.g. a higher toll may apply to large trucks as compared with smaller trucks, and passenger vehicles may have the lowest toll; additionally or alternatively, tolls could be based on other label information such as the vehicle registration locale, the number of miles traveled on the toll road, or so forth). The various data processing components 12, 16, 20 are suitably implemented by one or more electronic data processing devices, such as electronics (not shown) built into the camera 10, and/or a computer 30 installed at the toll booth 14, and/or a remote server computer (not shown) accessed by the computer 30 via the Internet or some other electronic data transfer network, or so forth. By way of illustrative example, electronics of the camera 10 may be programmed to perform generic portions of the pre-processing 12 such as blur compensation and/or automatic brightness/contrast adjustment by user-selection of an appropriate camera operational mode. Vehicle labeling specific portions of the pre-processing 12 such as segmenting the image to isolate the vehicle image I may be implemented by the toll booth computer 30 executing suitable software. The classifier 16 may be similarly implemented by the toll booth computer 30 executing image classification software that receives input image I. The vehicle classifier trainer 20 may be implemented by the toll booth computer 30 running classifier training software that receives as input the local labeled images 22 and the labeled images 24 from other cameras, the latter being received over the Internet or another data network or provided on an optical disk or other transportable data storage medium. In an alternative approach, the vehicle classifier trainer 20 may be implemented by a remote server computer running classifier training software that receives as input the local labeled images 22 and the labeled images 24 from other cameras, and the trained classifier 16 is then communicated from the server to the toll booth computer 30 via the Internet or another data network. It will be further appreciated that the various data processing components 12, 16, 20 may be embodied as a non-transitory storage medium storing instructions executable by the computer 30 and/or some other electronic data processing device to perform the disclosed processes. The non-transitory storage medium may, for example, be a hard disk or other magnetic storage medium, or a FLASH memory or other electronic storage medium, or an optical disk or other optical storage medium, various combinations thereof, or so forth.

The label 18 may be variously used. In illustrative FIG. 1, two examples are shown. In the first example, the vehicle label is selected from a set of vehicle type labels (passenger car, small truck, large truck, bus, et cetera), and the labeling system employs a look-up table to determine a toll, or toll scaling factor, for the vehicle type identified by the label 18 that is applied in determining the toll to be paid by the driver of the vehicle O. As an illustrative example, the toll may be computed by multiplying a distance-based charge times the toll scaling factor. Typically, the toll scaling factor is intended to account for the disparate impact of vehicles of different types on the toll road. In this illustrative example, a display device 32 (LCD or OLED display device or the like) integrated with or otherwise operatively connected with the computer 30 presents a display 34 including the image I of the vehicle O together with (or labeled with) the label 18 generated for the vehicle O, in this case converted to a turnpike toll of $2.50 in this illustrative example.

As another illustrative example depicted in diagrammatic FIG. 1, the vehicle label 18 is selected from the set of number of vehicle occupants (one, two, three, . . . ). Occupancy information may, for example, be used to determine whether the vehicle O is eligible to use the carpool lane (typically this is allowed if the vehicle carries at least a minimum number of passengers). An illustrative display 36 shows the image I of the vehicle O labeled with the label ("Occupants: 3") along with information about the conclusion ("Carpool lane: YES"). In an alternative formalism for this application, the label set can be a binary set, e.g. (1,0) with "1" denoting the vehicle is authorized to use the carpool lane and "0" denoting the vehicle is not so authorized.

Figure 2:
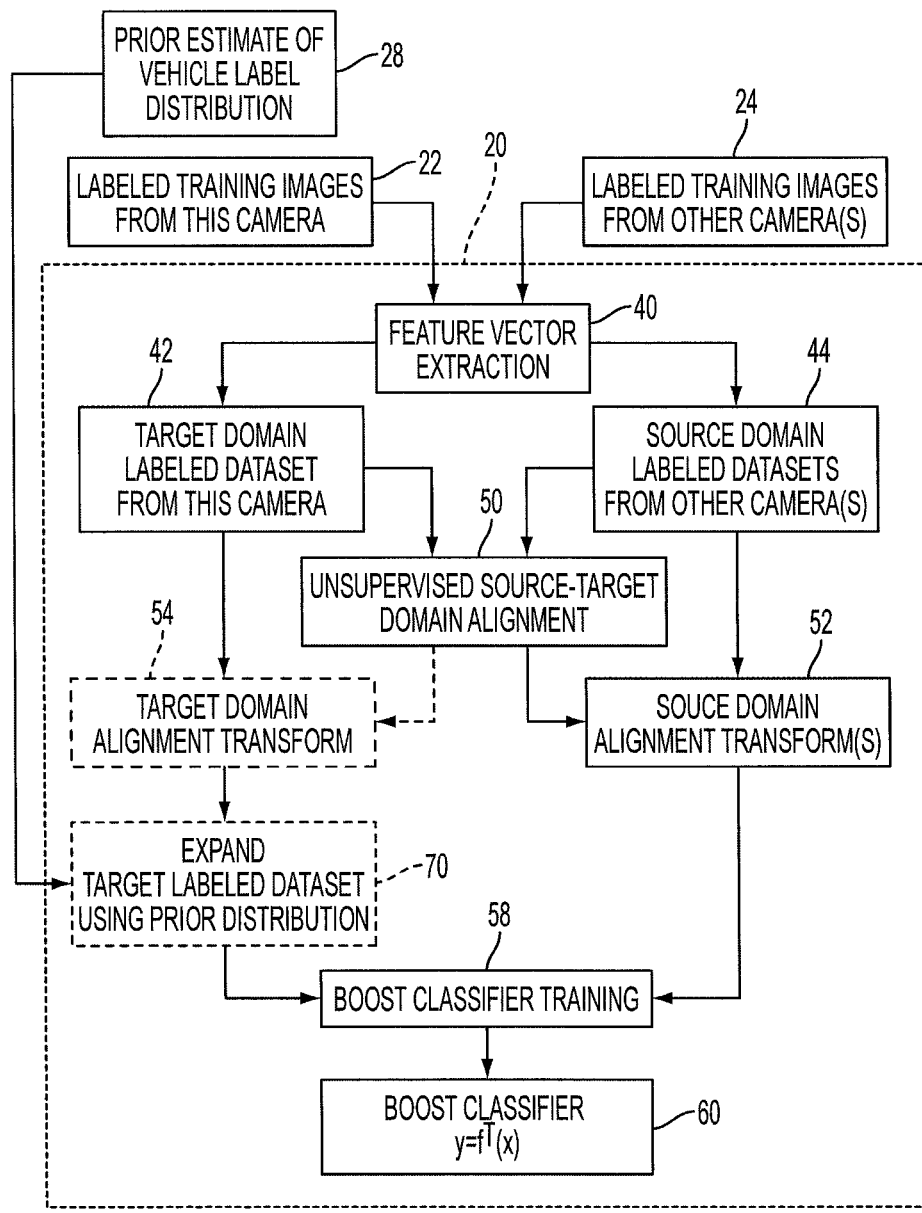
FIG. 2 diagrammatically shows the vehicle classifier trainer component of the camera-based vehicle identification system of FIG. 1.

With reference now to FIG. 2, some illustrative embodiments of the vehicle classifier trainer 20 are described. While the illustrative example pertains to camera-based vehicle labeling, more generally the disclosed classifier trainer can be used to train a classifier for labeling an image, or a classifier for labeling an object based on an input image of the object. As shown in FIG. 2, the classifier trainer 20 receives as input labeled training images 22 from the camera 10 (e.g., suitably described as "this" camera, or the "system" camera, or the "target" camera). The classifier trainer 20 additionally receives labeled training images 24 from other cameras. The training images 22 are pre-processed by the pre-processor 12 so that the training images 22 are comparable with the image I to be classified in terms of aspects such as cropping, brightness/contrast adjustment, resizing, or so forth. On the other hand, the training images 24 from other cameras may have substantively different pre-processing, as well as differences in terms of image characteristics such as vantage, camera-to-object distance, zoom setting, aperture settings, and so forth.

To generalize, the set of training images 22 are referred to here as images in a "target" domain, while the training images 24 are referred to here as images in two or more different "source" domains. In the illustrative vehicle labeling system in which the classifier training is being used to set up a new vehicle labeling installation, it will be appreciated that the number of images in the target domain training images set 22 is likely to be relatively small, as this set is generated manually by having the installer or some other person manually label images of vehicles acquired using the system camera 10. By contrast, the number of images in the source domain training images sets 24 may be substantially larger—for example, these images may be a collection of labeled images automatically generated during the normal course of operation over days, weeks, or months of vehicle labeling installations similar to the one shown in FIG. 1. As disclosed herein, the classifier trainer 20 advantageously applying an adaptive boosting (AdaBoost) algorithm to train a boost classifier, where the $r^{th}$ iteration of the AdaBoost algorithm includes sub-iterations that train candidate base classifiers on training sets that each combine the target domain training set 22 with one of the source training sets, and then selects a base classifier as the output of the iteration as the candidate base classifier with lowest error for the target domain training set. This advantageously leverages the source domain training images sets 24 to provide a more accurate trained classifier.

In order to be efficiently processed, a feature vector extraction component 40 converts the training images 22, 24 to feature vectors (or, said another way, image-representative feature vectors are extracted from the images). An element of the image-representative feature vector can store substantially any quantitative value drawn from the image that is useful for representing content of interest of the image. Features may be represented in various formats, and may be variously processed, for example using Fisher kernels. In some embodiments, a feature reduction process such as Principal Component Analysis (PCA) may be used to reduce the number of features so as to keep the feature vector length (that is, number of elements of the feature vector) to a reasonable number. In general, all images (the image I to be classified, and the various training images 22, 24) are processed by the same feature vector extraction process or component 40 so that a given element of the feature vector has the same meaning or significance, and the same dimensions or units, for all feature vectors representing images.

The processing performed by the feature vector extraction 40 on the target domain training images 22 generates a target domain labeled data set $D_T$ 42, and similarly the processing performed by the feature vector extraction 40 on the source domain training images 24 generates source domain labeled data sets $D_{S_k}$, k=1, . . . , N 44, where k indexes the N source domain image datasets. In general, N≥1. In some embodiments N≥2, that is, there are a plurality of source domain training image data sets, for example one source domain training image data set generated by each other camera. Thus, if there are (by way of illustrative example) fifteen other, previously installed, camera-based vehicle labeling systems in use, then N=15 with each source domain image data set $D_{S_k}$ being acquired by one of these previously installed labeling systems. Each of the data sets $D_T$ and $D_{S_k}$, k=1, . . . , N can be thought of as a different "domain" because the images in each set may be different in terms of substantive aspects such as vantage, camera-to-object distance, aperture or other camera settings, post-acquisition processing (cropping, de-blurring, et cetera), and so forth.

To provide a more generalized formalism (not limited to the illustrative example of vehicle labeling), a domain $\mathcal{D}$ is composed of a feature space X, and a marginal probability distribution P(X), where X={$x_1$, . . . , $x_n$}, and $x_i \in X$. That is, $\mathcal{D}:=(X;P(X))$. A task T is defined by a label space Y, and a function $f:X \rightarrow Y$. Learning the task T for the domain $\mathcal{D}$, in a machine learning context, amounts to estimating a classifier function $\tilde{f}:X \rightarrow Y$, from a given training data set D={$(x_1;y_1)$, . . . , $(x_n;y_n)$}, where again $x_i \in X$ and $y_i \in Y$, that best approximates $f$, according to certain criteria.

In the approach of the classifier trainer 20, in which source training sets $D_{S_k}$, k=1, . . . , N are used to improve the classifier for the target training set $D_T$, the target and source data sets and domains should be distinguished. The target domain is represented here as $D_T=(X;P_T(X))$, and it is desired to learn the target task $T_T=(Y;f^T)$, from the target training data $D_T=\{(x_1^T,y_1^T), \ldots, (x_{n_T}^T,y_{n_T}^T)\}$ where $n_T$ denotes the number of training instances in the target domain training data set $D_T$. In similar fashion, the $k^{th}$ source domain training data set (where 1≤k≤N as there are N source data sets) is in the $k^{th}$ source domain $\mathcal{D}_{S_k}=(X;P_{S_k}(X))$, and is suitably represented as the source training data set $$D_{S_k} = \{(x_1^{S_k}, y_1^{S_k}), \ldots, (x_{n_{S_k}}^{S_k}, y_{n_{S_k}}^{S_k})\}$$

where $n_{S_k}$ denotes the number of training instances in the $k^{th}$ source domain training data set $D_{S_k}$. The inductive transfer learning performed by the classifier trainer 20 improves the learning of the target classifier function $\tilde{f}^T:X \rightarrow Y$ by exploiting the knowledge provided by the source domain training data sets $D_{S_k}$, k=1, . . . , N.

With continuing reference to FIG. 2, the source domain and target domain training data sets 42, 44 are optionally aligned by an unsupervised source-target alignment process or component 50. Such an alignment serves to mitigate the impact of differences between domains $\mathcal{D}_T, \mathcal{D}_{S_1}, \ldots, \mathcal{D}_{S_N}$ in terms of substantive aspects such as vantage, camera-to-object distance, aperture or other camera settings, post-acquisition processing (cropping, de-blurring, et cetera), and so forth. The alignment can transform the feature vectors of the target and source training data sets to a (generally different) common domain space, or can transform the feature vectors of the source training data sets to the target domain (in which case no transformation is performed on the feature vectors of the target domain training data set 42.

An example of an alignment process that transforms the feature vectors of the source training data sets to the target domain is the iterative closest point (ICP) algorithm. See, e.g. Rusinkiewicz et al., "Efficient variants of the icp algorithm" in Proceedings of the Third Int'l. Conf. on 3-D Digital Imaging and Modeling, pages 145-152 (IEEE 2001). ICP is an iterative procedure that minimizes the mean square error between points in one domain and the closest points, respectively, in the other domain. At each iteration of the ICP algorithm, the linear transformation that best aligns the source and target models is computed. Starting from the two sets of instances $X_T=\{x_i^T\}$, as target data, and $X_S=\{x_i^S\}$, as source data, the goal is to find the transformation (A,B) which minimizes the distance between these two data sets. The goal of ICP is to determine for a source instance $x_i^S \in X^S$ the nearest target instance in target set $X_T$. At step k, a local transformation minimizing the Frobenius norm, is calculated for the two sets:

$$(A_k, B_k) = \|A_k X^S + B_k - X^t\|_F^2. \quad (1)$$

This procedure is iterated until convergence to a local minimum. The total transformation (A,B) is updated incrementally at each iteration k of the algorithm, $A:=A_k \cdot A$ and $B=B+B_k$. Convergence to a global minimum can be achieved if the initialization is good. Toward this end, in some implementations the previous coarse alignment procedure is performed before the fine one. ICP is first done on weighted representative samples from both sets, $SX_S \subset X_S$ and $SX_T \subset X^T$ where each sample instance $x^S \in SX_s$ and $x^T \in SX_t$ is weighted by the number of instances in its $\epsilon$-neighborhood, respectively.

An example of an alignment process that transforms the feature vectors of the target and source training data sets to a (generally different) common domain space is described in Fernando et al., "Unsupervised visual domain adaptation using subspace alignment", in ICCV (2013). The motivation for this approach is that, since source and target domains are drawn using different marginal distributions, there might exist subspaces in source and target domains which are more robust representations of the source and target domains and where the shift between these two domains can be learned. In this illustrative domain alignment approach, Principal Component Analysis (PCA) is used to select in both target and source domains d eigenvectors corresponding to the d largest eigenvalues. These eigenvectors are used as bases of the source and target subspaces, respectively denoted by $S_s$ and $S_d$, where $S_s, S_d \in R^{D \times d}$. The subspaces $S_s$ and $S_s$ are orthonormal, $S_s S_s' = I^d$ and $S_t S_t' = I^d$, where $I_d$ is the identity matrix of size d, and $S_s$ and $S_t$ are used to learn the shift between the two domains. A linear transformation is used to align the source subspaces to the target one. This step allows direct comparison of source and target samples in their respective subspaces without unnecessary data projections. A subspace alignment approach is suitably used to achieve this task. Basis vectors are aligned by using a transformation matrix M from $S_s$ to $S_t$. M is learned by minimizing the following Bregman matrix divergence: $F(M) = \|S_s M - S_t\|_F^2$, where $\|\cdot\|_2^F$ denotes Frobenius norm. Since this norm is invariant to orthonormal operation, it can be rewritten as follows:

$$F(M) = \|S_s' S_s M - S_s' S_t\|_F^2 = \|M - S_s' S_t\|_F^2 \qquad (2)$$

Thus the optimal transformation M is obtained as $M = S_s' S_t$. This implies that the new coordinate system is equivalent to $S = S_s S_s' S_t$ which represents the target aligned source coordinate system. Matrix M transforms the source subspace coordinate system into the target subspace coordinate system by aligning the source basis vectors with the target ones. In this common space, target instances $x_t$ are projected using $S_t$, $x_t^P = x_t S_t$ and source instances get projected into the new space using transformation S, $x_s^P = x_s S$. In the case of multiple (e.g. N≥2) sources, one transformation $S_i$ is generated by for each source $S_i$.

With continuing reference to FIG. 2, the output of the unsupervised source-target domain alignment process or component 50 outputs a source domain alignment transform 52 as just described. For alignment embodiments such as that of Fernando et al. that transforms the feature vectors of the target and source training data sets to a (generally different) common domain space, the unsupervised source-target domain domain alignment process or component 50 outputs a target domain alignment transform 54. (By contrast, for an alignment process such as ICP that transforms the sources to the target domain, there is no target domain alignment transform).

In an operation 58, boost classifier training is performed to train a boost classifier 60 suitably written as $f^T(x) = \sum_{r=1}^{M} \beta_r h_r(x)$, that is, as a sum of base classifiers $h_r(x)$ weighted by base classifier weights $\beta_r$. (The base classifiers $h_r(x)$ are sometimes referred to herein as weak classifiers $h_r(x)$, and in general the terms "base classifier" and "weak classifier" are used interchangeably herein). The base classifiers $h_r(x)$ can, in general, be any type of classifier, and the output of each individual base classifier $h_r(x)$ may have a relatively weak correlation with the labels of the target domain training set $D_T$—hence the alternative name "weak" classifier. The boost classifier combines M of these weak classifiers $h_r(x)$ in the sum $f^T(x) = \sum_{r=1}^{M} \beta_r h_r(x)$ so as to produce a strong classifier (that is, a classifier that is well-correlated with the target domain training instance labels). By way of non-limiting illustrative example, the base classifiers $h_r(x)$ can be decision trees, linear classifiers (for example, employing a learned hyperplane in the case of a binary classifier), or so forth.

The trained boost classifier 60 is usable to classify an image acquired by the system camera 10 and represented by a feature vector x. The boost classifier training leverages both the target domain training data set 42 and the plurality of source domain data sets 44. This enables the training to identify and take advantage of information contained in the source domain data sets 44 that are most closely related to the target domain. The illustrative boost classifier training 58 trains the boost classifier 60 using the target domain training set $D_T$ 42 comprising labeled feature vectors representing images acquired by the target camera 10 and also using the plurality of source domain training sets $D_{S_1}, \ldots, D_{S_N}$ 44 (where N≥1, and in some embodiments N≥2) comprising labeled feature vectors representing images of objects acquired by cameras other than the target camera 10. The training 58 applies an adaptive boosting (AdaBoost) algorithm to generate the base classifiers $h_r(x)$ and the base classifier weights $\beta_r$ of the boost classifier $f^T(x)$. However, the r=1, . . . , M iterations of the standard AdaBoost algorithm (see, e.g. Freund et al., "A short introduction to boosting", Journal-Japanese Society For Artificial Intelligence, 14(771-780):1612, 1999) are modified in that the $r^{th}$ iteration includes training a plurality of candidate base classifiers $h_r^k(x)$ and selecting $h_r(x)$ from a set of previously trained candidate base classifiers. In some embodiments, $h_r(x)$ is selected from the candidate base classifiers generated in all iterations 1, . . . , r; in other embodiments, $h_r(x)$ is selected only from the base classifiers $h_r^k(x)$ generated in the $r^{th}$ iteration. Each candidate base classifier $h_r^k(x)$ is trained on a training set combining the target domain training data set $D_T$ and $k^{th}$ source domain data set $D_{S_k}$, for example using a set union combination $(D_T \cup D_{S_k})$.

Adaptive boosting (AdaBoost, e.g. Freund et al. supra) is a machine learning algorithm that provides boosting by aggregation of weak learners' predictions. At every iteration, it increases the accuracy of the selection of the next weak classifier by adjusting weights of the training instances, giving more importance to mis-classified instances as they are believed to be the "most informative" for the next selection.

A "transfer" AdaBoost (TrAdaBoost) extension of conventional AdaBoost has been described, which facilitates transfer of information from a source training set to a target training set. See Dai et al., "Boosting for transfer learning", in Proceedings of the $24^{th}$ Int'l. Conf. on Machine Learning pages 193-200 (ACM 2007). The approach of Dai et al. assumes that there is abundant source training data (that is, a large data set $D_S$) to learn a classifier, but the target domain and task are different from the source, that is, $\mathcal{D}_S \neq \mathcal{D}_T$ and $T_S \neq T_T$. The TrAdaBoost learning algorithm exploits a small target training data set $D_T$, in conjunction with the source training data set $D_S$, for driving the boosting of a target classifier $f^T$. The target training instances drive the selection of a weak classifier in the same way as AdaBoost does. On the other hand, at every iteration the source training instances are given less importance when they are misclassified. This is because they are believed to be the most dissimilar to the target instances, and therefore their impact to the next weak classifier selection should be weakened.

TrAdaBoost does not provide the ability to leverage multiple source training data sets, such as the source training data sets $D_{S_k}$ k=1, . . . , N where N≥2. One way to overcome this difficulty is to combine, e.g. concatenate, the plurality of source training data sets into a single data set, that is, $D_S = D_{S_1} \cup D_{S_2} \cup \ldots \cup D_{S_N}$ and then applying TrAdaBoost with this combined source data set. However, this approach can lose differential information contained in the different source data sets. For example, considering the illustrative application of camera-based vehicle labeling in which each source training data set $D_{S_k}$ comes from a different camera installation, it may be the case that some camera installations are more similar to the target camera 10 than others in terms of relevant aspects such as vantage, camera characteristics, camera-to-road distance, image pre-processing, and so forth. It would be advantageous to place more prominence in the adaptive boosting on these "more similar" source training data sets as compared with source training data sets that are less similar to the target camera 10.

In approaches disclosed herein, the AdaBoost algorithm is modified in that in the $r^{th}$ iteration a plurality of candidate base classifiers $h_r^k(x)$ are trained. The base classifier $h_r(x)$ for the $r^{th}$ iteration is selected from a set of previously trained candidate base classifiers. In some embodiments the selection is made only from the candidate base classifiers $h_r^k(x)$ generated in the $r^{th}$ iteration; while in other embodiments the selection is made from candidate base classifiers $h_r^t(x)$ generated in the $r^{th}$ iteration as well as candidate base classifiers from previous iterations (e.g., candidate base classifiers $h_{r-1}^k(x)$). In latter embodiments, the selection is preferably made with removal, that is, a candidate base classifier selected as base classifier $h_r(x)$ is removed from the pool of available candidates and cannot also be selected in a later iteration (e.g. as $h_{r+1}(x)$). Each candidate base classifier $h_r^k(x)$ is trained on a training set combining the target domain training data set $D_T$ and $k^{th}$ source domain data set $D_{S_k}$, e.g. combined as $D_T \cup D_{S_k}$. In this way, the distinctiveness of the various, generally different, source training data sets $D_{S_1}, \ldots, D_{S_N}$ is retained and individually leveraged in the boost classifier training 58.

Some adaptive boosting (AdaBoost) algorithms disclosed herein as suitable implementations for use in the boost classifier training 58 incorporate the following aspects: they allow knowledge transfer from multiple sources (e.g. the labeled training images from other cameras 24, represented as feature vectors 44); accurate knowledge transfer is facilitated by using a heap-like structure for managing candidate classifiers (in embodiments in which the base classifier is selected from candidate base classifiers generated in the current and previous iterations); the target error estimation $C^t$ is used for re-weighting source training instances (see Samir Al-Stouhi et al., Adaptive boosting for transfer learning using dynamic updates", in Machine Learning and Knowledge Discovery in Databases, ed. Gunopulos et al., vol. 6911 of Lecture Notes in Computer Science pages 60-75 (Springer Berlin Heidelberg, 2011)); and in some embodiments class priors (e.g. the prior estimate of vehicle label distributions 28 for the target camera 10) are incorporated into the boost classifier training 58.

In general, it is expected that abundant training data $D_{S_k}$, $k=1, \ldots, N$ are available from one or more sources ($N \geq 1$), each of which is different from the target, that is, $\mathcal{D}_{S_k} \neq \mathcal{D}_T$ and $T_{S_k} \neq T_T$. By training each candidate base classifier $h_r^k(x)$ using a combination of the target training data set $D_T$ and one source training data set $D_{S_k}$, and then selecting the base classifier $h_r(x)$ for the $r^{th}$ iteration from a pool of candidate base classifiers, the source that appears to be the most closely related to the target (at the $r^{th}$ iteration) is chosen. This approach reduces the effects of negative transfer caused by the imposition to transfer knowledge from a single source domain, which may be only loosely related to the target domain. In the disclosed boost classifier training approaches, at every iteration r each source $S_k$, independently from the others, combines its training data $D_{S_k}$ with the target training data $D_T$ to construct a candidate weak classifier $h_r^k(x)$. A pool of weak classifiers is maintained during the learning process in the form of a priority queue (PQ), from which the source that minimizes the target classification error is selected as the base classifier $h_r(x)$. (In an alternative embodiment, the selection of $h_r(x)$ is limited to a pool consisting of the base classifiers $h_r^k(x)$ produced during the current iteration r).

Algorithm 1 presents an illustrative embodiment of the boost classifier trainer 58. Algorithm 1 takes as input the N source training datasets $D_{S_1}, \ldots, D_{S_N}$ and the target training data set $D_T$, and generates M base classifiers $h_1(x), h_M(x)$ and corresponding weights $\beta_r$ in order to compose the target classifier $f^T(x) = \Sigma_{r=1}^M \beta_r h_r(x)$. The weighting update of the source training instances is as in the transfer AdaBoost algorithm of Dai et al., "Boosting for transfer learning", in Proceedings of the $24^{th}$ Int'l. Conf. on Machine Learning pages 193-200 (ACM 2007). The weighting update of the target training instances is as in conventional AdaBoost. See, e.g. Freund et al., "A short introduction to boosting", Journal-Japanese Society For Artificial Intelligence, 14(771-780):1612, 1999. At every iteration, the inner loop of Algorithm 1 (lines 6-11) computes N candidate base classifiers $h_r^1(x), \ldots, h_r^N(x)$ from the N training sets $D_T \cup D_{S_1}, \ldots, D_T \cup D_{S_N}$, respectively, and computes the corresponding classification errors $\epsilon_r^k$ on the target domain training data set $D_T$. Then the candidate base classifier whose target classification error is minimal among all candidate base classifiers generated so far (and not taken yet) is selected as $h_r(x)$.

In Algorithm 1, the priority queue (PQ) is initialized as an empty set at line 3. Thereafter, PQ accumulates all constructed candidate base classifiers, with the accumulation being maintained across the outer loop (r) iterations. In line 12, for each iteration r the candidate base classifier in PQ with lowest target domain error is selected as $h_r(x)$, and this selected candidate base classifier is removed (deleted) from PQ. In an alternative embodiment, lines 3 and 4 are swapped so that PQ is initialized before each iteration r and the selection of $h_r(x)$ is made only from the candidate base classifiers generated in the current iteration r—in this case the delete portion of line 12 can also be removed.

---

Algorithm 1

Require: Target training set $D_T$, N source training sets $D_{S_1}, \ldots, D_{S_N}$, a base learning algorithm Learner and the maximum number of iterations M.
Ensure: Target classifier $f^T: X \rightarrow Y$ 1:
$$\text{Set } \beta_S = \frac{1}{2} \ln\left(1 + \sqrt{2 \ln \frac{\Sigma_{k=1}^N N_{S_k}}{M}}\right)$$

2: Initialize the initial source weights $w^{S_k} = (w_1^{S_k}, \ldots, w_{N_k}^{S_k})$, $k = 1, \ldots, N$ and target weights $w^T = (w_1^T, \ldots, w_{N_T}^T)$ with a selected distribution
3: Set PQ = create-heap( ) ; priority queue of candidate weak learners.
4: for r = 1, ... , M do
5: Normalize the weight vector $w = (w^{S_1}, \ldots, w^{S_N}, w^T)$
6:    for k = 1, ... , N do
7:    Set $D^k = D_T \cup D_{S_k}$ and $p^k = (w^T, w^{S_k})/(\Sigma_i w_i^T + \Sigma_i w_i^{S_k})$
8:    Call Learner on the combined training set $D^k$ with distribution $p_k$ and generate a hypothesis $h_r^k: X \rightarrow Y$ 9:
$$\text{Calculate the error of } h_r^k \text{ on } D_T: \varepsilon_T^k = \Sigma_j \frac{w_i^T \cdot [h_r^k(x_i^T) = y_i^T)]}{\Sigma_i w_i^T}$$

10:    Insert(PQ, $(h_r^k, \epsilon_r^k)$)
11: end for
12: Extract from PQ the classifier $h_r: X \rightarrow Y$ with the minimal error:

-continued

Algorithm 1

($h_r$, $\epsilon_r$) = find-min(PQ); delete-min(PQ).
13: Set $\beta_r = \epsilon_r/(1 - \epsilon_r)$ and $C_r = 2(1 - \epsilon_r)$;
    $\epsilon_r$ is required to be less than 1/2.
14: Update the weight vectors:
    $w_i^{Sk} = w_i^{Sk} C_r \exp(\beta_s[h_r(x_i) = y_i^{Sk}])$, $1 \le k \le N$, $1 \le i \le N_k$
    $w_i^T = w_i^T \exp(\beta_r[h_r(x_i) \ne y_i^T])$, $1 \le i \le N_T$.
15: end for
16: Output the aggregated estimate $f^T(x) = \text{sign}(\Sigma_{r=1}^M \beta_r f_r(x))$ With continuing reference to FIG. 2, in some embodiments class priors (e.g. the prior estimate of vehicle label distributions 28 for the target camera 10) are incorporated into the boost classifier training 58. To this end, in an operation 70 the target domain training set $D_T$ is expanded based on the prior estimate 28 of the labels distribution for the target domain $\mathcal{D}_T$. In one suitable approach, the operation 70 comprises adding to the target domain training set $D_T$ additional synthesized instances with different labels, in which the synthesized instances have initialized weight vectors $w_i^T$ for the Adaboost algorithm computed based on label probabilities generated using the prior estimate 28 of the labels distribution.

As an illustrative example, a binary classification case is considered, in which the class set Y=(−1, +1) and probability distribution $\pi(y)$ over possible labels +1 and −1. To take into account the class probabilities, the following objective function is minimized:

$$\min \sum_i (L(y_i, F(x_i)) + \lambda KL(\pi, f(x_i))) \quad (3)$$

where the first term $L(y_i, F(x_i))$ is the empirical data fit and the second term $KL(\pi, f(x_i))$ is the prior model fit. The parameter $\lambda$ controls the trade-off between these two terms. In the adaptive boosting, the empirical loss is given by $L(y_i, F(x_i)) = \ln(1 + \exp(-y_i f(x)))$. To measure the prior model fit, Expression (3) uses the Kullback-Leibler (KL) divergence between the prior model distribution $\pi(x_i)$ and the distribution over labels associated with the constructed boosting model $f(x_i)$, $$KL(p; q) = \sum_i \ln \frac{p(i)}{q(i)} p(i).$$

Combining the foregoing, the function to minimize can be written as the following:

$$\min \sum_i (\ln(1 + \exp(-y_i f(x)) + \quad (4)$$
$$\lambda(\pi_+(x_i) \ln(1 + \exp(-f(x_i)) + \pi_-(x_i)) \ln(1 + \exp(f(x_i)))$$

where $\pi_+(x) = p(y=+1|x)$ and $\pi_-(x) = p(y=-1|x)$ are probabilities of classes +1 and −1, respectively. This function corresponds to over large set of instances with non-negative weights.

To minimize Expression (4), the target domain training data set $D_T$ is expanded in the operation 70 to a larger weighted training set that includes all of the target training instances $(x_i, y_i) \in D_T$, each with unit weight, and additionally includes two new synthesized instances for each original instance $(x_i, y_i)$, namely the synthesized instance $(x_i; +1)$ with weight $\lambda \pi_+(x_i)$, and the synthesized instance $(x_i; -1)$ with weight $\lambda \pi_-(x_i)$. These weights $w_0$ are used in computing $W_t$ according to:

$$W_t(i) = \frac{w_0(i)}{1 + \exp\left(y_i \sum_{r=0}^{r=t-1} h_r(x_i)\right)} \quad (5)$$

where the index i ranges over all of the examples in the new training set (including the synthesized training instances). To maintain the formalism, a 0-th base function $h_0$ is added to incorporate priors $\pi_+(x_i)$, $\pi_-(x_i)$ from the start. In particular, the initial base classifier $h_0(x) = \sigma^{-1}(\pi_+(x_i)) = \ln(\pi_+(x_i)/\pi_-(x_i))$ is defined, and $h_0$ is included in computing the final classifier $f$.

Extension of the foregoing binary case to the multi-class case (with the number of classes C>2) is straightforward. Each label $y_i$ is a vector in C-dimensional binary space $y_i \in 2^C$, where the k-th component indicates whether the instance is in class k. The function $f(x, k)$ is the estimated probability that instance x is in class k. The empirical loss then becomes $L(y_i, f(x_i)) = \Sigma_i \Sigma_k (1 + \exp(-y_{ik} f(x_i, k)))$.

Figure 3:
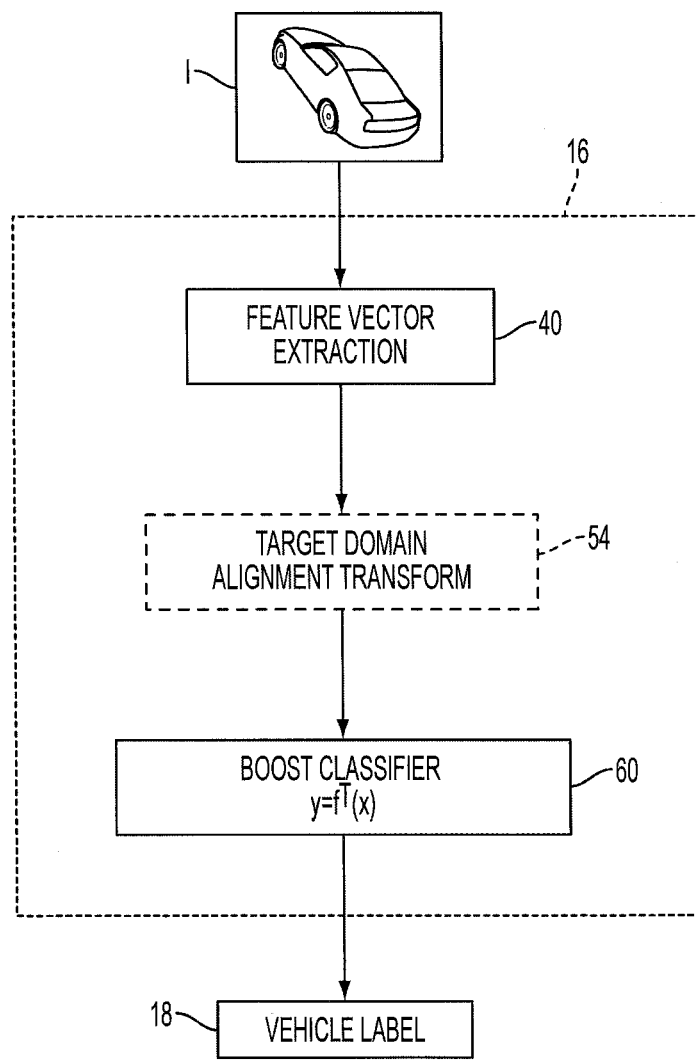
FIG. 3 diagrammatically shows the vehicle classifier component of the camera-based vehicle identification system of FIG. 1.

With reference to FIG. 3, operation of the illustrative vehicle classifier 16 is described. This is the "labeling phase" of the camera-based vehicle labeling process. A vehicle is photographed by the camera 10 and the photograph undergoes the optional pre-processing 12 as previously described with reference to FIG. 1 to generate the input image I. The feature vector extraction component 40 then converts the input image I to a feature vector (or, said another way, an image-representative feature vector is extracted from the input image I). If the unaligned source-target domain alignment 50 of the training of FIG. 2 generated a target domain alignment transform 54, then this is applied to the feature vector representing the input image I. The feature vector representing the input image I (optionally transformed 54) is then input to the trained boost classifier 60 (which was output by the training 58 as already described with reference to FIG. 2) so as to generate the vehicle label 18. Optionally, post-processing (not shown in FIG. 3) may be applied, such as by way of illustrative example converting a vehicle type label into a road toll or fee in monetary units using a look-up table.

In the following, some illustrative evaluations of the image and object labeling techniques disclosed herein are described. The evaluations employed five image datasets from ImageCLEF'14 Domain Adaptation challenge (http://www.imagecleforg/2014/adaptation): Caltech-256, which consists of 256 object categories with a collection of 30,607 images; ImageNet ILSVRC2012, organized according to the WordNet hierarchy, with an average of 500 images per node; PASCAL VOC2012, which is an image dataset for object class recognition with 20 object classes; Bing, containing all 256 categories from Caltech-256 and is augmented with 300 web images per category that were collected through textual search using Bing; and Sun, which is the scene understanding dataset containing 899 categories populated with 130,519 images. Of these, the following source domains were designated: $S_1$ is the Caltech data set; $S_2$ is the ImageNet data set; $S_3$ is the PASCAL dataset; and $S_4$ is the Bing data set. The SUN dataset served as the target domain. Twelve classes common to all five datasets were selected: aeroplane, bike, bird, boat, bottle, bus, car, dog, horse, monitor, motorbike, people. Each source includes 600 annotated instances, while from the target domain 60 labeled training images and 600 unlabeled test image instances were obtained. These data were used to run image labeling experiments in accord with the disclosed image labeling techniques.

As a baseline approach, target domain data were used alone (that is, without using any of the source data sets) to train a baseline SVM classifier (LIBSVM package, http://www.csie.ntu.edu.tw/cjlin/libsvm/) with an optimal set of parameters and kernel functions.

As another baseline approach the transfer AdaBoost (TrAdaBoost) algorithm of Dai et al., "Boosting for transfer learning", in Proceedings of the 24$^{th}$ Int'l. Conf. on Machine Learning pages 193-200 (ACM 2007) was used. As TrAda-Boost can use only a single source, the four source domains were concatenated in $2^4-1=15$ combinations, obtained by an exhaustive enumeration of all source subsets. For each combination, the TrAdaBoost algorithm was used to train a boost classifier for the target domain.

In further evaluations, Algorithm 1 was used with N=2, N=3, or N=4 source domains, in various experiments.

In further evaluations, Algorithm 1 was used with N=2, N=3, or N=4 source domains, in various experiments, and further extended by including prior knowledge π as described with reference to optional operation 70 of FIG. 2.

In the evaluations, a number of parameters were tuned to obtain the best performance, including the multi-class SVM parameters and kernel functions, λ trade-off for the prior knowledge, the weight initialization in DA approaches, and so forth. Additionally, each of the four evaluated methods was tested with the unsupervised alignment of source to target domains 50 described with reference to FIG. 2, employing the ICP alignment method. For comparison, some evaluations were run without performing the source-target alignment (i.e. "no ICP"). In evaluations employing the class prior π, all C=12 classes were assumed to be equally represented in the target data, that is, π(y)=Uniform (1,C).

TABLE 1

| Method | no ICP | with ICP |
|---|---|---|
| No domain adaptation (multi-class SVM) | 21.67 | 22.25 |
| TrAdaBoost with one source | 24.53 | 25.94 |
| TrAdaBoost with concatenated source combinations | 26.92 | 27.19 |
| Algorithm 1 with sources $S_3$ and $S_4$ | 28.15 | 29.94 |
| Algorithm 1 with sources $S_1$, $S_3$, and $S_4$ | 28.63 | 30.39 |
| Algorithm 1 with sources $S_1$, $S_2$, $S_3$, and $S_4$ | 28.34 | 29.67 |
| Algorithm 1 with concatenated source combination $\{S_2, S_3, S_4\}$ (here N = 1) | 28.72 | 30.52 |
| Algorithm 1 with sources $S_1$, $S_2$, $S_3$, and $S_4$ and with Priors (λ = 0.75) | 32.96 | 34.15 |
| Algorithm 1 with concatenated source combination $\{S_2, S_3, S_4\}$ and with Priors (λ = 0.85) | 33.35 | 34.83 |

Table 1 reports the best accuracy obtained with the different classifier training methods. These results indicate that for the tested data sets Algorithm 1 works with multiple source domains, but the multiple source and concatenation scenarios provided similar performance—that is, concatenating sources was as beneficial as keeping them separate. This is believed to be due to the closeness between the source instances of the four tested source data sets. In situations in which the source domains have very different distributions, keeping them separate is expected to provide improved results. Using the error estimation $C_r$ is seen to help address some drawbacks of TrAdaboost, such as a too quick convergence and a high sensitivity to the first half of weak classifiers.

Knowledge of class priors and their integration in the framework provided substantial increase in labeling accuracy. Tuning the parameter A was straightforward and a range of values yielded good performance.

The illustrative embodiments relate to camera-based object labeling or, analogously, to labeling of images of objects acquired by cameras. In such embodiments, the target domain and the one or more source domains are suitably defined by the respective cameras used to acquire the images. In the illustrative embodiment, the target domain is defined as the domain of images of objects acquired by the system camera 10, and each source domain $S_1, \ldots, S_N$ is defined as the domain of images of objects acquired by a camera other than the system camera. More generally, the disclosed labeling techniques can be employed to label images generally, generated by various mechanisms. The image domains are suitably defined in such embodiments based on common mechanisms of image generation. By way of a further illustrative example, handwriting analysis may operate on handwriting images generated electronically by persons writing on a pressure-sensitive tablet, in which case there is no camera involved. The image domains in this case may correspond to different persons—for example, the image to be labeled may be a writing generated by a target person acquired using the pressure-sensitive tablet, the target domain training set may be labeled handwriting samples generated by the target person, and each source domain training set may be handwriting samples generated by a single person (other than the target person) using the same (or possibly a different) pressure-sensitive tablet.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A labeling system comprising:
an electronic data processing device configured to label an image to be labeled belonging to a target domain by operations including:
training a boost classifier $f^T(x)=\Sigma_{r=1}^{M}\beta_r h_r(x)$ to classify an image belonging to the target domain and represented by a feature vector x in a feature space X, the training using a target domain training set $D_T$ comprising labeled feature vectors in the feature space X representing images belonging to the target domain and a plurality of source domain training sets $D_{S_1}, \ldots, D_{S_N}$ where N≥2 comprising labeled feature vectors in the feature space X representing images belonging to source domains $S_1, \ldots, S_N$ respectively, the training comprising expanding the target domain training set $D_T$ based on a prior estimate of the labels distribution for the target domain and, after expanding the target domain training set $D_T$, applying an adaptive boosting (AdaBoost) algorithm to generate the base classifiers $h_r(x)$ and the base classifier weights $\beta_r$ of the boost classifier $f^T(x)$, wherein the $r^{th}$ iteration of the AdaBoost algorithm includes (i) performing N sub-iterations in which the $k^{th}$ sub-iteration trains a candidate base classifier $h_r^k(x)$ on a training set combining the target domain training set $D_T$ and the source domain training set $D_{S_k}$ and

(ii) selecting $h_r(x)$ as the candidate base classifier with lowest error for the target domain training set $D_T$;

computing a feature vector $x_{in}$ in the feature space X representing the image to be labeled; and generating a label for the image to be labeled by operations including evaluating $f^T(x_{in})=\Sigma_{r=1}^{M}\beta_r h_r(x_{in})$.

2. The labeling system of claim 1 wherein the labeling system is a camera-based object labeling system further comprising:

a system camera arranged to acquire images of objects;

wherein the target domain is defined as the domain of images of objects acquired by the system camera and the image to be labeled is an image of an object to be labeled acquired by the system camera;

wherein each source domain $S_1, \ldots, S_N$ is defined as the domain of images of objects acquired by a camera other than the system camera; and wherein the electronic data processing device is further configured to generate a label for the object to be labeled based on the label generated for the image to be labeled.

3. The camera-based object labeling system of claim 2 further comprising:

a display device operatively connected with the electronic data processing device to display the image of the object to be labeled together with the label generated for the object.

4. The labeling system of claim 1 wherein the $k^{th}$ sub-iteration trains the candidate base classifier $h_r^k(x)$ on a union $D_T \cup D_{S_k}$ of the target domain training set $D_T$ and the source training set $D_{S_k}$.

5. The labeling system of claim 1 wherein the training of the boost classifier $f^T(x)=\Sigma_{r=1}^{M}\beta_r h_r(x)$ further comprises:

before applying the Adaboost algorithm, performing unsupervised source-target domain alignment to align the target domain training set $D_T$ and the source training sets $D_{S_k}$, k=1, ..., N.

6. The labeling system of claim 1 wherein the $r^{th}$ iteration of the AdaBoost algorithm further includes:

(iii) updating weight vectors $w_i^{S_k}$ for the training instances i of the source training sets $D_{S_k}$, k=1, ..., N based on the error for the target domain training set $D_T$ of the candidate base classifier selected as the base classifier $h_r(x)$.

7. The labeling system of claim 1 wherein the Adaboost algorithm maintains a queue PQ of candidate base classifiers across iterations of the Adaboost algorithm, and the selecting operation (ii) includes:

(ii)(a) selecting $h_r(x)$ as the candidate base classifier in the queue PQ with lowest error for the target domain training set $D_T$; and (ii)(b) removing the selected candidate base classifier from the queue PQ.

8. The labeling system of claim 1 wherein the expanding of the target domain training set $D_T$ comprises:

adding to the target domain training set $D_T$ additional synthesized instances with different labels wherein the synthesized instances have initialized weight vectors for the Adaboost algorithm computed based on label probabilities generated using the prior estimate of the labels distribution.

9. A labeling method for labeling an image to be labeled belonging to a target domain, the image labeling method comprising:

computing feature vectors representing target domain training images belonging to the target domain;

labeling the target domain training images using labels selected from a set of labels to generate a target domain training set $D_T$ comprising labeled feature vectors representing the target domain training images;

receiving a plurality of source domain training sets $D_{S_1}, \ldots, D_{S_N}$ where N≥1 comprising feature vectors representing images belonging to source domains different from the target domain that are labeled using labels selected from the set of labels;

performing unsupervised source-target domain alignment to align the target domain training set $D_T$ and the source training sets $D_{S_k}$, k=1, ..., N;

training a boost classifier $f^T(x)=\Sigma_{r=1}^{M}\beta_r h_r(x)$ to classify an image belonging to the target domain and represented by a feature vector x, the training using the aligned target domain training set $D_T$ and plurality of source domain training sets $D_{S_1}, \ldots, D_{S_N}$, the training comprising expanding the target domain training set $D_T$ based on a prior estimate of the labels distribution for the target domain and, after expanding the target domain training set $D_T$, applying an adaptive boosting (AdaBoost) algorithm to generate the base classifiers $h_r(x)$ and the base classifier weights $\beta_r$ of the boost classifier $f^T(x)$, where r=1, ..., M; and computing a feature vector $x_{in}$ representing the image to be labeled; and generating a label for the image to be labeled by operations including evaluating $f^T(x_{in})_{r=1}^{M}\beta_r h_r(x_{in})$;

wherein the feature vector computing operations, the training operation, and the generating operation are performed by an electronic data processing device.

10. The labeling method of claim 9 wherein N≥2 and the $r^{th}$ iteration of the AdaBoost algorithm includes (i) training candidate base classifiers $h_r^k(x)$ wherein $h_r^k(x)$ is trained on a training set combining the target domain training set $D_T$ and the source training set $D_{S_k}$ and (ii) selecting $h_r(x)$ from a pool of trained candidate base classifiers based on a target domain error metric.

11. The labeling method of claim 10 wherein the operation (ii) selects $h_r(x)$ from one of:

the pool of trained candidate base classifiers $h_r^k(x)$ trained during the $r^{th}$ iteration; and the pool of trained candidate base classifiers trained during the $r^{th}$ iteration and any earlier iterations, wherein the operation (ii) further includes removing the candidate base classifier selected as $h_r(x)$ from the pool.

12. The labeling method of claim 10 wherein the operation (i) includes performing k=1, ..., N sub-iterations in which the $k^{th}$ sub-iteration trains a candidate base classifier $h_r^k(x)$ on a training set combining the target domain training set $D_T$ and the source training set $D_{S_k}$.

13. The labeling method of claim 9 wherein the set of labels is a set of object labels, and the image to be labeled, the target domain training images, and the images belonging to source domains different from the target domainare images of objects, and the labeling method further comprises:

displaying, on a display device, the image to be labeled with the generated object label.

14. The labeling method of claim 9 wherein the set of labels is a set of object labels, and the image to be labeled, the target domain training images, and the images belonging to source domains different from the target domainare images of objects, and the labeling method further comprises:

generating and displaying, on a display device, an object inspection result based on the generated label.

15. The labeling method of claim 13 wherein one of:
the objects are vehicles and the vehicle inspection result is a number of occupants of the vehicle; or
the objects are articles of manufacture being processed by an assembly line and the article inspection result is a pass or fail result.

16. The labeling method of claim 9 wherein the set of labels is a set of vehicle labels, and the image to be labeled, the target domain training images, and the images belonging to source domains different from the target domain are images of vehicles, and the labeling method further comprises:
assigning a toll or fee associated with the generated vehicle label wherein the assigning is performed by the electronic data processing device; and
displaying, on a display device operatively connected with the electronic data processing device, the image to be labeled together with the assigned toll or fee.

17. The labeling method of claim 9 wherein the $r^{th}$ iteration of the AdaBoost algorithm further includes:
updating weight vectors $w_i^{S_k}$ for the training instances i of the source training sets $D_{S_k}$, k=1, . . . , N based on the error for the target domain training set $D_T$ of the base classifier $h_r(x)$.

18. The labeling method of claim 9 wherein the expanding of the target domain training set $D_T$ comprises:
adding to the target domain training set $D_T$ additional synthesized instances with different labels wherein the synthesized instances have initialized weight vectors for the Adaboost algorithm computed based on label probabilities generated using the prior estimate of the labels distribution.

19. A non-transitory storage medium storing instructions executable by an electronic data processing device to perform a camera-based object labeling method to label an object based on an image of the object acquired using a target camera, the camera-based object labeling method including the operations of:
training a boost classifier $f^T(x)=\Sigma_{r=1}^M \beta_r h_r(x)$ to classify an image acquired by the target camera and represented by a feature vector x, the training using a target domain training set $D_T$ comprising labeled feature vectors representing images acquired by the target camera and a plurality of source domain training sets $D_{S_1}, \ldots, D_{S_N}$ where N≥2 comprising labeled feature vectors representing images of objects acquired by cameras other than the target camera, the training comprising expanding the target domain training set $D_T$ based on a prior estimate of the labels distribution for the target domain and, after the expanding, applying an adaptive boosting (AdaBoost) algorithm to generate the base classifiers $h_r(x)$ and the base classifier weights $\beta_r$ of the boost classifier $f^T(X)$, wherein the AdaBoost algorithm includes r=1, . . . , M iterations and the $r^{th}$ iteration includes training a plurality of candidate base classifiers $h_r^k(x)$ wherein each candidate base classifier $h_r^k(x)$ is trained on a training set $D_T \cup D_{S_k}$ and selecting $h_r(x)$ from a set of previously trained candidate base classifiers; and
computing a feature vector $x_{in}$ representing the image of the object; and
generating a label for the object by evaluating $f^T(x_{in})=\Sigma_{r=1}^M \beta_r h_r(x_{in})$.

20. The non-transitory storage medium of claim 19 wherein the expanding of the target domain training set $D_T$ comprises:
adding to the target domain training set $D_T$ additional synthesized instances with different labels wherein the synthesized instances have initialized weight vectors for the Adaboost algorithm computed based on label probabilities generated using the prior estimate of the labels distribution.

21. The non-transitory storage medium of claim 19 wherein the $r^{th}$ iteration of the AdaBoost algorithm further includes:
(iii) updating weight vectors $w_i^{S_k}$ for the training instances i of the source training sets $D_{S_k}$, k=1, . . . , N based on the error for the target domain training set $D_T$ of the candidate base classifier selected as the base classifier $h_r(x)$.

* * * * *